United States Patent
Richardson

(10) Patent No.: US 7,255,157 B2
(45) Date of Patent: *Aug. 14, 2007

(54) HEAT EXCHANGER FOR HEATING OF FUEL CELL COMBUSTION AIR

(75) Inventor: Curtis A. Richardson, Voorheesville, NY (US)

(73) Assignee: Delphi Technologies, Inc., Troy, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 248 days.

(21) Appl. No.: 11/018,774

(22) Filed: Dec. 20, 2004

(65) Prior Publication Data

US 2005/0103479 A1 May 19, 2005

Related U.S. Application Data

(63) Continuation of application No. 10/375,834, filed on Feb. 25, 2003, now abandoned.

(51) Int. Cl.
*F28D 7/08* (2006.01)

(52) U.S. Cl. ...................... 165/163; 165/158

(58) Field of Classification Search ..................... None
See application file for complete search history.

(56) References Cited

U.S. PATENT DOCUMENTS

| | | | | |
|---|---|---|---|---|
| 3,185,210 A | * | 5/1965 | Kuhne et al. ............. | 165/134.1 |
| 3,309,072 A | * | 3/1967 | Cummings ................... | 165/81 |
| 3,516,807 A | * | 6/1970 | Gray et al. .................... | 48/107 |
| 3,718,506 A | * | 2/1973 | Fischer et al. ................ | 429/24 |
| 4,650,728 A | * | 3/1987 | Matsumura et al. .......... | 429/19 |
| 5,449,568 A | * | 9/1995 | Micheli et al. ............... | 429/20 |
| 6,232,005 B1 | * | 5/2001 | Pettit ........................... | 429/19 |
| 6,309,770 B1 | * | 10/2001 | Nagayasu et al. ............ | 429/19 |
| 2002/0074111 A1 | * | 6/2002 | Seeger et al. ............... | 165/163 |
| 2002/0160246 A1 | * | 10/2002 | Walsh .......................... | 429/26 |
| 2003/0235745 A1 | * | 12/2003 | Mook et al. .................. | 429/35 |
| 2004/0018403 A1 | * | 1/2004 | Burch et al. .................. | 429/17 |
| 2004/0175605 A1 | * | 9/2004 | Eshraghi et al. ............. | 429/31 |

FOREIGN PATENT DOCUMENTS

EP 494321 A1 * 5/1992
JP 2916055 B * 4/1999

* cited by examiner

*Primary Examiner*—Allen J. Flanigan
(74) *Attorney, Agent, or Firm*—Paul L. Marshall

(57) ABSTRACT

A heat exchanger for a solid-oxide fuel cell assembly. A plurality of parallel tubes conveys fuel cell stack exhaust gas from a first manifold means to a second manifold means. The tubes are highly corrugated to increase the wall area and decrease the wall thickness. The tubes are disposed in a jacket through which is passed incoming air to be heated. The tubes may be linear between two manifolds, or they may be curved such that the first and second manifold functions are accommodated within a single component.

15 Claims, 4 Drawing Sheets

HEAT EXCHANGER FOR HEATING OF FUEL CELL COMBUSTION AIR

CROSS-REFERENCE TO RELATED APPLICATIONS

This application is a continuation of application Ser. No. 10/375,834, which was filed on Feb. 25, 2003 now abandoned.

TECHNICAL FIELD

The present invention relates to solid-oxide fuel cells (SOFCs); more particularly, to heat exchangers for heating incoming combustion air in an SOFC assembly; and most particularly, to an improved heat exchanger for increasing heat exchange efficiency and reducing heat exchanger manufacturing cost and complexity.

BACKGROUND OF THE INVENTION

Fuel cells combining hydrogen and oxygen to produce electricity are well known. A known class of fuel cells includes a solid oxide electrolyte layer through which oxygen anions migrate; such fuel cells are referred to in the art as "solid-oxide" fuel cells (SOFCs).

In some applications, for example, as an auxiliary power unit (APU) for an automotive vehicle, an SOFC is preferably fueled by "reformate" gas, which is the effluent from a catalytic gasoline oxidizing reformer. Reformate typically includes amounts of carbon monoxide (CO) as fuel in addition to molecular hydrogen. The reforming operation and the fuel cell operation may be considered as first and second oxidative steps of the liquid hydrocarbon, resulting ultimately in water and carbon dioxide. Both reactions are exothermic, and both are preferably carried out at relatively high temperatures, for example, in the range of 700° C. to 100° C.

Air enters an SOFC fuel cell at ambient temperature and desirably is preheated before being sent to the fuel cell stacks. A convenient and economical way to heat the air is by abstracting heat via a heat exchanger from the fuel cell exhaust which exits the fuel cell combustor at about 950° C. In the prior art, a typical heat exchanger employed for this purpose is of a well known plate-and-frame design wherein a plurality of heat-exchange modules is assembled as a stack. A plurality of alternating hot and cold gas flow spaces are separated by heat transfer plates. A typical prior art heat exchanger for use in an SOFC may comprise more than 100 individual plates and frames and can require more than 200 feet of brazing to seal the edges of all the modules, and is thus complicated and expensive to fabricate.

What is needed is an efficient heat exchanger for an SOFC wherein the number of components and fabrication costs are significantly reduced.

It is a principal object of the present invention to reduce the cost and complexity of an SOFC heat exchanger.

SUMMARY OF THE INVENTION

Briefly described, a heat exchanger for a solid-oxide fuel cell assembly includes a plurality of parallel tubes for conveying a first gas, preferably a hot gas, from a first manifold means to a second manifold means. The only brazing required is to attach each tube to each manifold. Preferably, the tubes are highly corrugated in bellows-like form to increase the wall area and decrease the wall thickness. The tubes are disposed in a jacket through which is passed a second gas, preferably a cool gas. The tubes may be linear between two manifolds, or they may be curved such that the first and second manifold functions are accommodated within a single component.

BRIEF DESCRIPTION OF THE DRAWINGS

These and other features and advantages of the invention will be more fully understood and appreciated from the following description of certain exemplary embodiments of the invention taken together with the accompanying drawings, in which.

DESCRIPTION OF THE PREFERRED EMBODIMENTS

Figure 1:
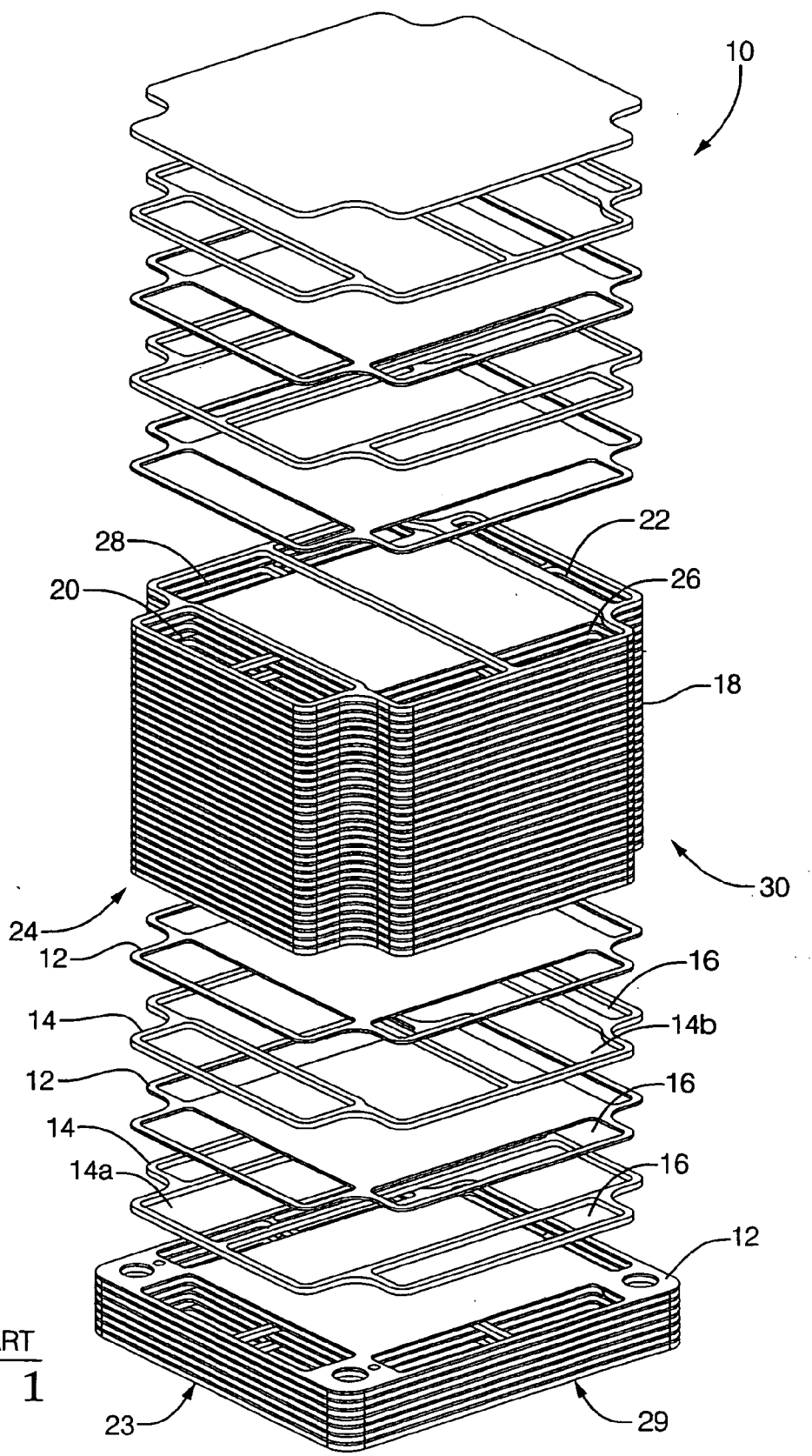
FIG. 1 is an isometric view from the front, partially exploded, of a prior art plate-and-frame heat exchanger.

Referring to FIG. 1, a prior art heat exchanger 10 comprises a plurality of alternating hot and cold fluid flow spaces formed by alternating rectangular plates 12 and frames 14. In an SOFC assembly, the hot fluid is hot exhaust gas from the fuel cell stack and the cold fluid is combustion air entering the assembly. Each plate and frame has perforated extensions 16 at all four edges such that, when assembled into a solid stack 18, the perforations define inlet and exhaust manifolds 20,22 for a first fluid 23 flowing across the plates in a first direction 24, and inlet and exhaust manifolds 26,28 for a second fluid 29 flowing across opposite sides of the plates in a second and orthogonal direction 30. The extensions of first frames 14a are open on their inner edges to permit access of first fluid 23 from manifold 20 to first sides of plates 12, and the extensions of second frames 14b are open on their inner edges to permit access of second fluid 29 to the opposite sides of plates 12. It will be seen that the sequence of plates and frames 12-14a-12-14b represents a modular repeat, and that the full stack is simply a plurality of such modular repeats, the number of modules being as desired for a particular heat exchange requirement. In prior art SOFC heat exchanger 10, the number of modules is typically about 25, requiring 100 or more components. After the entire stack of plates and frames is assembled, the edges of all plates and frames are sealed as by brazing to prevent fluid leakage from the heat exchanger.

Figure 2:
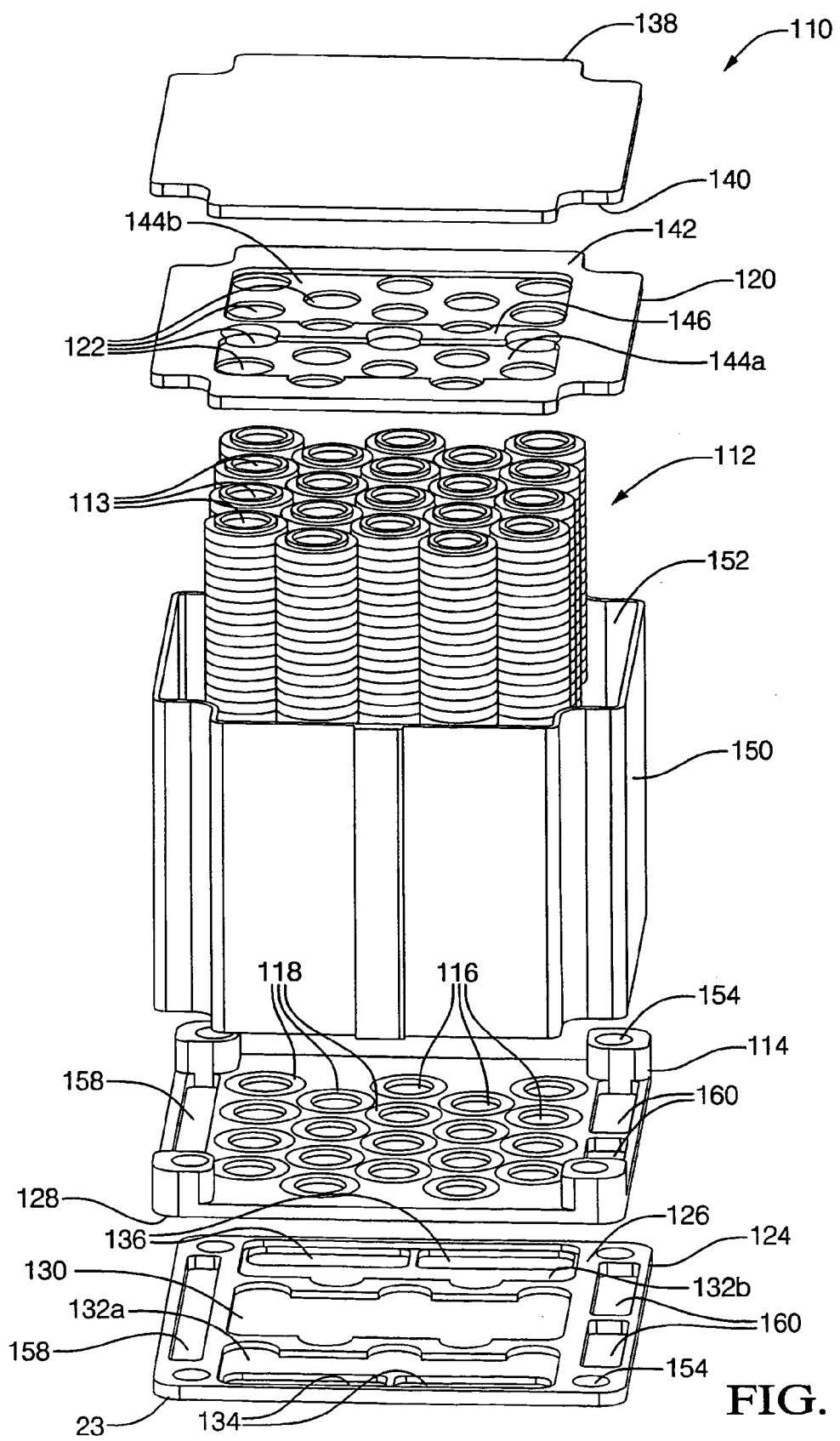
FIG. 2 is an exploded isometric view from the front of a first embodiment of a heat exchanger in accordance with the invention.

Referring to FIG. 2, a first embodiment 110 of an SOFC heat exchanger in accordance with the invention includes a plurality of parallel metal tubes 112 having ends 113 (one set of ends not visible). Lower end plate 114 is provided with a plurality of openings 116 arranged in a pattern, each opening being surrounded by a lip 118 for receiving a first end (not visible) of a tube 112. Upper end plate 120 is similarly provided with openings 122 and lips (not visible). The exemplary pattern of openings and tubes is four staggered rows of five tubes each. Obviously, other patterns are possible within the scope of the invention. The tubes are attached to the end plate lips as by brazing.

Metal tubes 112 preferably are axially corrugated as by hydro-forming into bellows form such that the surface area of each tube is substantially greater than the surface area of a non-corrugated tube having equal length and diameter. Preferably, the surface area is at least doubled. In addition, the bellows-forming process, which is well known in the art, causes thinning of the tube wall. As a result, the thermal conductance of heat exchanger 110 can be as much as 200% greater than that of prior art heat exchanger 10 of comparable size.

Preferably, tubes 112 are formed of a nickel-based high temperature alloy, for example, Inconel 625.

A base plate 124 has a planar upper surface 126 for mating against a planar lower surface 128 of lower end plate 114. Surface 126 is relieved in three areas. One is a central well 130 defining an intermediate manifold for mating with the central two rows of ten openings 116; the other two are lateral wells 132a,132b, each of which defines an intake and exhaust manifold, respectively, which mates with a respective lateral row of five openings 116. Well 132a is provided with slots 134 extending through plate 124 for mating with a supply such as an intake manifold (not shown) of a first fluid 23, preferably the hot exhaust gas from the fuel cell stack. Well 132b is provided with similar slots 136 for mating with a return pathway through an exhaust manifold (not shown) for first fluid 23.

A cover plate 138 has a planar lower surface 140 for mating against a planar upper surface 142 of upper end plate 120. Surface 142 is relieved in two wells 144a,144b, each of which defines a first and second crossover manifold, respectively. Each well contains two respective lateral rows of five openings 122. Wells 144a,144b are separated by a median 146.

The result of this arrangement is an "M" shaped path for gas through five parallel tube assemblies. A first gas (fuel cell exhaust gas) at a first starting temperature enters through slots 134, passes through openings 116 into the first staggered row of five tubes 112, passes upwards through openings 122 into crossover manifold 144a, passes downwards through openings 122 into the second staggered row of five tubes 112, passes through openings 116 into central well 130, passes upward through openings 116 into the third staggered row of five tubes 112, passes upward through openings 112 into second crossover manifold 144b, passes downward through openings 112 into the fourth staggered row of five tubes 112, passes downward through openings 116 into lateral well or manifold 132b, and passes out of heat exchanger 110 via slots 136.

Referring still to FIG. 2, tubes 112 and upper plate 120 are surrounded by a jacket 150 defining a jacketed space 152 between jacket 150 and the walls of tubes 112. Jacket 150 is sealed to cover plate 138 and to lower end plate 114. Lower end plate 114 is attached to base plate 124 as by bolts (not shown) through bores 154. Lower end plate 114 and base plate 124 are provided with slots 158,160. A second gas at a second starting temperature (air to be heated) enters through inlet slots 158, passes into jacketed space 152, passes around corrugated tubes 112 abstracting heat therefrom, and exits through exhaust slots 160.

Figure 3:
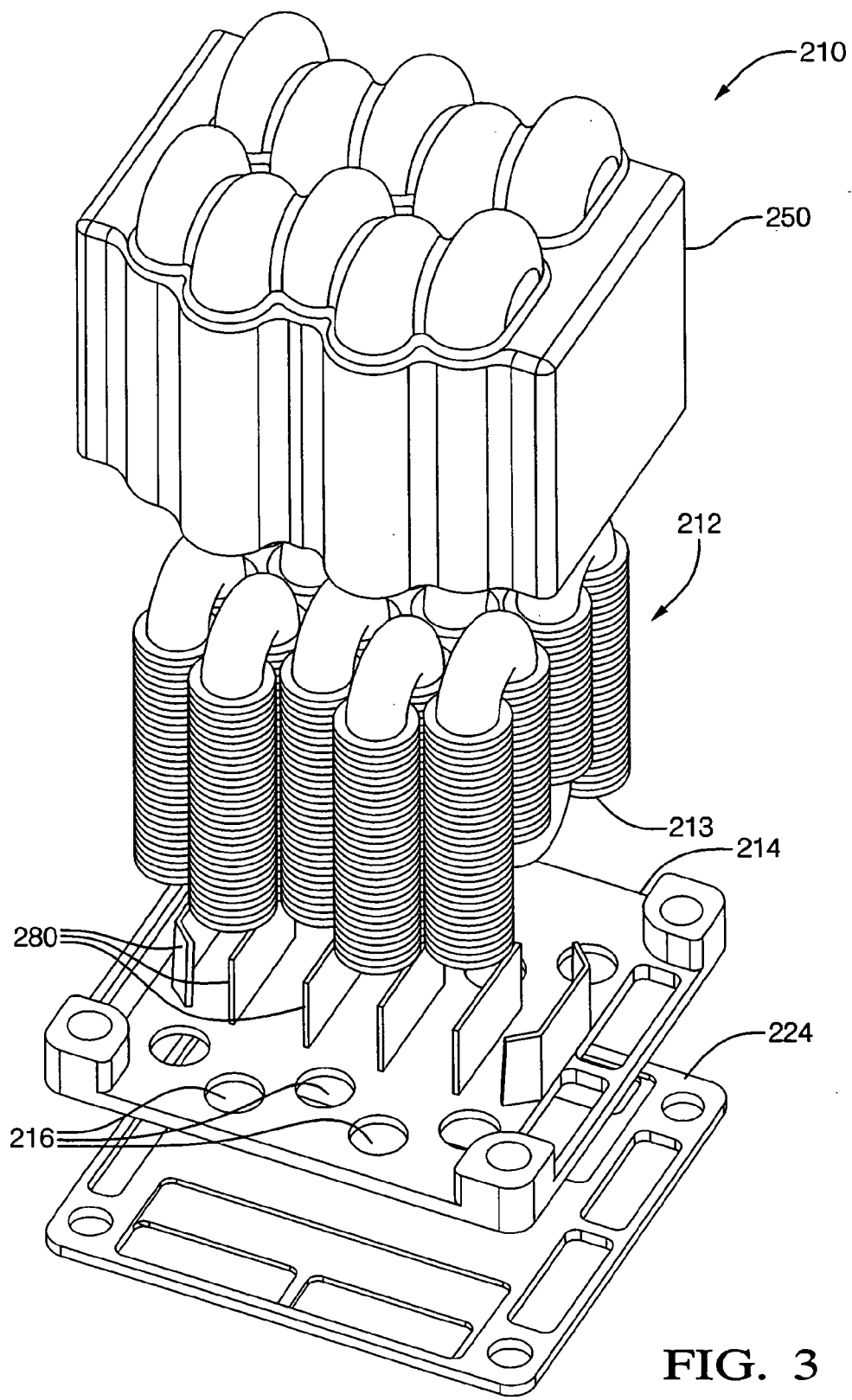
FIG. 3 is an exploded isometric view from the front of a second embodiment of a heat exchanger in accordance with the invention.

Referring to FIG. 3, a second embodiment 210 is identical in gas flow path to embodiment 110 but is substantially simplified in construction. The "M" shaped flow path is clearly visible in five staggered M-tubes 212 having ends 213. Each M-tube 212 preferably is corrugated along its four linear portions as shown. Upper plate 120 and cover 138 are eliminated, their functions being cast into a closed jacket 250 conformable with M-tubes 212. Further, lower end plate 214 is simplified to have only ten openings 216 rather than twenty openings 116 as in embodiment 110. The total brazing required between tubes and plates is reduced from forty joints to ten. When tubes 212 are one-half inch in diameter, the total length of brazing required is about 15 inches, as compared to 200 inches required for prior art exchanger 10 or 60 inches for first embodiment 110. Preferably, bottom plate 214 is provided with a plurality of attached fins 280 disposed adjacent M-tubes 212 for improving air flow around the tubes. Base plate 224 is simplified to eliminate central well 130 from embodiment 110.

Figure 4:
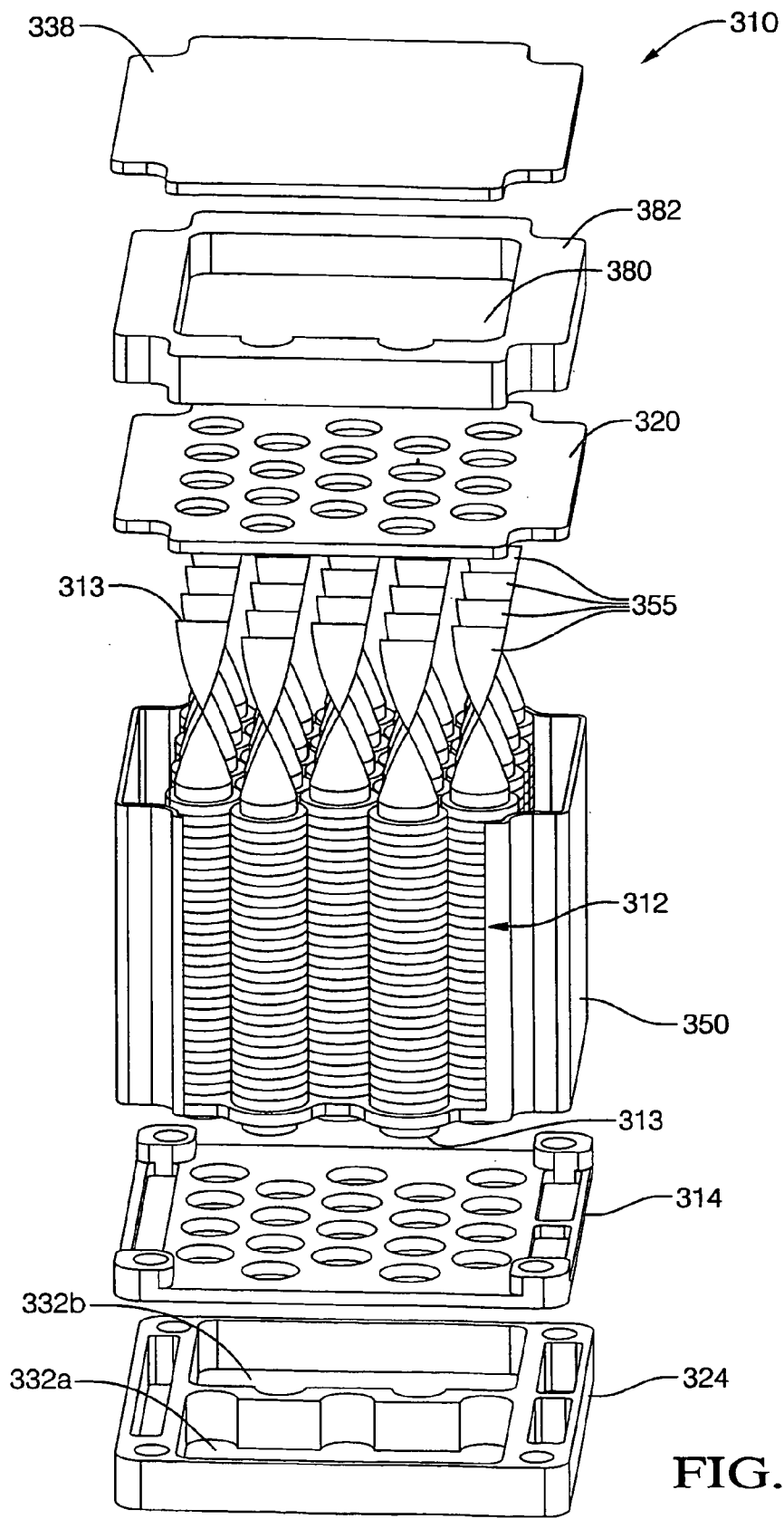
FIG. 4 is an exploded isometric view from the front of a third embodiment of a heat exchanger in accordance with the invention.

The "M" flow path indicated in first and second embodiments 110,210 can give rise to undesirably high back pressures because of the relatively long flow path. Referring to FIG. 4, a third embodiment 310 reduces the flow path by half, albeit at a cost of sixty joints as in first embodiment 110. The basic flow arrangement provided by the twenty corrugated tubes 312 (shown for clarity via a cutout in jacket 350), having tubular inserts 313, is ten parallel U-shaped flow paths instead of five M-shaped flow paths. Lower end plate 314 is substantially identical with plate 114 in FIG. 2. Base plate 324 is configured as essentially a frame having two openings 332a,332b which become inlet and exit chambers when plate 324 is disposed between a mounting manifold (not shown) and plate 314. Upper end plate 320 is welded to tubes 312 as in FIG. 2, and a single upper manifold space 380 is provided by a cutout in a new spacer frame element 382 into which tubes 312 debouch. Cover plate 338 is similar to cover plate 138. The flow path then is simply from inlet opening 332a upwards through the forward ten tubes 312 into manifold space 380, then downwards through the rear ten tubes 312 into exhaust opening 332b. Jacket 350 may be substantially identical with jacket 150.

A potential drawback of flowing a gas through corrugated tubing is stagnation of gas within the recesses of the corrugations. Referring still to FIG. 4, each tube 312 preferably is provided with an internal spiral turbulator 355 which is installed into the tube prior to brazing. (For purposes of clarity, each turbulator is shown partially removed from the respective tubes). Turbulator 355 is formed from sheet metal, preferably a high-temperature alloy, and twisted through an axial angle such as 180° about its axis. The turbulator induces a swirling flow of gas through the tube, promoting flushing of gas from the corrugation recesses.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A heat exchanger, comprising:
   a) at least one fuel cell exhausting a first fluid;
   b) a first plate defining a first slot, a second slot, and a first manifold;
   c) a second plate defining a second manifold and a third manifold;
   d) a first tubular element for conveying said first fluid at a first starting temperature, said first tubular element having first and second ends, said first end of said first tubular element in fluid communication with said first slot, said second end of said first tubular element in fluid communication with said second manifold;
   e) a second tubular element for conveying said first fluid having first and second ends, said first end of said second tubular element in fluid communication with said second manifold, said second end of said second tubular element in fluid communication with said first manifold;

f) a third tubular element for conveying said first fluid having first and second ends, said first end of said third tubular element in fluid communication with said first manifold, said second end of said fourth tubular element in fluid communication with said third manifold;

g) a fourth tubular element for conveying said first fluid having first and second ends, said first end of said fourth tubular element in fluid communication with said third manifold, said second end of said third tubular element in fluid communication with said second slot; and h) a jacket surrounding at least one of said tubular elements for conveying a second fluid at a second starting temperature around said at least one of said tubular elements, whereby heat is transferred between said first fluid and said second fluid.

2. A heat exchanger in accordance with claim 1 wherein at least one of said tubular elements is corrugated.

3. A heat exchanger in accordance with claim 1 wherein said first fluid and said second fluid are both gases.

4. A heat exchanger in accordance with claim 1 wherein said first fluid is fuel cell exhaust and said second fluid is air.

5. A heat exchanger in accordance with claim 1 further including a cover plate, wherein said second manifold is defined by said cover plate and a first well formed in said second plate, and wherein said third manifold is defined by said cover plate and a second well formed in said second plate.

6. A heat exchanger in accordance with claim 1 wherein said tubular elements are arranged for parallel flow of said first fluid therein between said first and second plates.

7. A heat exchanger, comprising:
a) at least one fuel cell exhausting a first fluid;
b) an array of said tubular elements arranged into five M-shaped flow paths for conveying said first fluid at a first starting temperature, said tubular elements having first and second ends;
c) first and second connecting means attached to said first and second ends, respectively, for conducting said first fluid into and out of said at least one tubular element, said tubular elements arranged for parallel flow of said first fluid therein between said first and second connecting means; and
d) a jacket surrounding said tubular elements for conveying a second fluid at a second starting temperature around said tubular elements, whereby heat is transferred between said first fluid and said second fluid.

8. A fuel cell assembly comprising a heat exchanger for exchanging heat between fuel cell exhaust gas and incoming air, said exchanger including:
at least one fuel cell exhausting said exhaust gas;
a first plate defining a first slot, a second slot, and a first manifold;
a second plate defining a second manifold and a third manifold;
a first tubular element for conveying said exhaust gas at a first starting temperature, said first tubular element having first and second ends, said first end of said first tubular element in fluid communication with said first slot, said second end of said first tubular element in fluid communication with said second manifold;
a second tubular element for conveying said exhaust gas having first and second ends, said first end of said second tubular element in fluid communication with said second manifold, said second end of said second tubular element in fluid communication with said first manifold;
a third tubular element for conveying said exhaust gas having first and second ends, said first end of said third tubular element in fluid communication with said first manifold, said second end of said third tubular element in fluid communication with said third manifold;
a fourth tubular element for conveying said exhaust gas having first and second ends, said first end of said fourth tubular element in fluid communication with said third manifold, said second end of said fourth tubular element in fluid communication with said second slot, and
a jacket surrounding said at least one of said tubular elements for conveying said incoming air at a second starting temperature around said at least one of said tubular elements, whereby heat is transferred between said exhaust gas and said incoming air.

9. A heat exchanger in accordance with claim 8 wherein at least one of said tubular elements is corrugated.

10. A heat exchanger in accordance with claim 9 wherein said tubular elements are arranged for parallel flow of said exhaust therein between said first and second plates.

11. A fuel cell assembly comprising a heat exchanger for exchanging heat between fuel cell exhaust gas and incoming air, said exchanger including:
at least one fuel cell exhausting said exhaust gas;
an array of twenty tubular elements arranged into five M-shaped flow paths for conveying said exhaust gas at a first starting temperature, said tubular elements including first and second ends;
first and second connecting means attached to said first and second ends, respectively, for conducting said exhaust gas into and out of said tubular elements, said tubular elements arranged for parallel flow of said exhaust therein between said first and second connecting means; and
a jacket surrounding said tubular elements for conveying said incoming air at a second starting temperature around said tubular elements, whereby heat is transferred between said exhaust gas and said incoming air.

12. A method for exchanging heat in a fuel cell assembly, the method comprising:
providing a first plate defining a first slot, a second slot, and a first manifold;
providing a second plate defining a second manifold and a third manifold;
providing a first tubular element having first and second ends, said first end of said first tubular element in fluid communication with said first slot, said second end of said first tubular element in fluid communication with said second manifold;
providing a second tubular element having first and second ends, said first end of said second tubular element in fluid communication with said second manifold, said second end of said second tubular element in fluid communication with said first manifold;
providing a third tubular element having first and second ends, said first end of said third tubular element in fluid communication with said first manifold, said second end of said third tubular element in fluid communication with said third manifold;
providing a fourth tubular element having first and second ends, said first end of said fourth tubular element in fluid communication with said third manifold, said second end of said fourth tubular element in fluid communication with said second slot;

providing a jacket at least partially surrounding the at least one of said tubular elements;

conveying a fuel cell exhaust fluid at a first starting temperature through at least a portion of at least one of said tubular element elements; and conveying an incoming fluid at a second starting temperature between the jacket and the at least one of said tubular elements, whereby heat is transferred between the fuel cell exhaust fluid and the incoming fluid.

13. A method in accordance with claim 12 wherein the fuel cell exhaust fluid is a gas.

14. A method in accordance with claim 12 wherein the incoming fluid is air.

15. A method in accordance with claim 12 wherein at least one of the tubular elements is corrugated.

* * * * *